(12) United States Patent
Chang (10) Patent No.: US 12,513,112 B2
(45) Date of Patent: Dec. 30, 2025

(54) NETWORK APPARATUS AND NETWORK ATTACK BLOCKING METHOD THEREOF

(71) Applicant: Moxa Inc., New Taipei (TW)

(72) Inventor: Yi Chang, New Taipei (TW)

(73) Assignee: Moxa Inc., New Taipei (TW)

( * ) Notice: Subject to any disclaimer, the term of this patent is extended or adjusted under 35 U.S.C. 154(b) by 194 days.

(21) Appl. No.: 18/366,701

(22) Filed: Aug. 8, 2023

(65) Prior Publication Data

US 2024/0414124 A1 Dec. 12, 2024

(30) Foreign Application Priority Data

Jun. 9, 2023 (TW) .................................. 112121717

(51) Int. Cl.
*H04L 9/40* (2022.01)

(52) U.S. Cl.
CPC ...... *H04L 63/0236* (2013.01); *H04L 63/1416* (2013.01); *H04L 63/1441* (2013.01)

(58) Field of Classification Search
CPC ............. H04L 63/0236; H04L 63/1416; H04L 63/1441
See application file for complete search history.

(56) References Cited

U.S. PATENT DOCUMENTS

| 7,380,123 | B1 | 5/2008 | Hernacki et al. | |
|---|---|---|---|---|
| 2002/0110123 | A1* | 8/2002 | Shitama | H04L 63/08 370/389 |

(Continued)

FOREIGN PATENT DOCUMENTS

| CN | 109862045 | 6/2019 |
|---|---|---|
| CN | 114422163 | 4/2022 |

(Continued)

OTHER PUBLICATIONS

"Search Report of Europe Counterpart Application", issued on Feb. 19, 2024, p. 1-p. 8.

(Continued)

*Primary Examiner* — Daniel B Potratz
*Assistant Examiner* — Matthias Habtegeorgis
(74) *Attorney, Agent, or Firm* — JCIPRNET (57) ABSTRACT

A network apparatus and a network attack blocking method thereof are disclosed. The network apparatus includes a network interface device, a storage device, and a processor. The network interface device connects a network. The storage device stores a block list. The processor is coupled to the network interface device and the storage device, and selectively allows at least one communication port to serve as a service port for connecting with an external device according to environment information of the network, receives a network packet sent by the external device through the network by using the network interface device, and determines whether a destination port of the network packet is one of the service ports. If the destination port is one of the service ports, the processor establishes a connection with the external device and provides services. If the destination port is not one of the service ports, the processor blocks the connection of the external device and adds identification information of the external device to the block list.

12 Claims, 4 Drawing Sheets

(56) References Cited

U.S. PATENT DOCUMENTS

| | | | |
|---|---|---|---|
| 2006/0212572 A1* | 9/2006 | Afek | H04L 63/1491 |
| | | | 709/225 |
| 2007/0011740 A1* | 1/2007 | Davis | H04L 63/1458 |
| | | | 726/22 |
| 2011/0145910 A1 | 6/2011 | Barnes et al. | |
| 2012/0023572 A1 | 1/2012 | Williams, Jr. et al. | |
| 2016/0149933 A1 | 5/2016 | Schrader et al. | |
| 2016/0173526 A1* | 6/2016 | Kasman | H04L 63/1458 |
| | | | 726/23 |
| 2020/0267103 A1* | 8/2020 | Hannikainen | H04L 63/1441 |
| 2020/0322368 A1* | 10/2020 | Cohen | G06N 3/0499 |
| 2021/0120022 A1 | 4/2021 | Kaderábek et al. | |
| 2023/0269229 A1* | 8/2023 | Jain | H04L 63/0263 |
| | | | 726/11 |
| 2023/0344862 A1* | 10/2023 | Koral | H04L 63/1458 |
| 2024/0015138 A1* | 1/2024 | Yanagi | H04L 63/20 |

FOREIGN PATENT DOCUMENTS

| | | |
|---|---|---|
| CN | 114650153 | 6/2022 |
| EP | 1461704 | 9/2004 |
| TW | 1783195 | 11/2022 |

OTHER PUBLICATIONS

"Office Action of Taiwan Counterpart Application", issued on May 29, 2024, p. 1-p. 9.

* cited by examiner

NETWORK APPARATUS AND NETWORK ATTACK BLOCKING METHOD THEREOF

CROSS-REFERENCE TO RELATED APPLICATION

This application claims the priority benefit of Taiwan application serial no. 112121717, filed on Jun. 9, 2023. The entirety of the above-mentioned patent application is hereby incorporated by reference herein and made a part of this specification.

BACKGROUND

Technical Field

The invention relates to a network security apparatus and a method thereof, and more particularly, to a network apparatus and a network attack blocking method thereof.

Description of Related Art

An attack blocking strategy adopted by a conventional network apparatus is to reduce services as much as possible with the smallest attack surface, so as to avoid more weaknesses of the apparatus. An attacker may conduct reconnaissance and scanning before launching an attack, so as to learn the attack surface of the apparatus. This process is mostly achieved through automated tools, so that the strategy of the smallest attack surface is only to limit attack points of the attacker, but allows the attacker to focus on the limited attack surface for evaluation and exploration after scanning.

Conventional protection against network attacks requires additional opening of communication ports to serve as honeypots to lure the attacker to attack and implement attack blocking, these additional opened communication ports require additional processing of network connections, and require additional processing on the apparatus or require analysis and calculation of external devices connected to the honeypots, so as to identify the attacker, and such process will occupy computing resources and memory of the apparatus.

SUMMARY

The invention provides a network apparatus and a network attack blocking method thereof, which identifies an attacker by identifying whether a destination port of a network packet is legal, and use extremely low resources to achieve a protection effect.

A network apparatus in the invention includes a network interface device, a storage device, and a processor. The network interface device is configured to connect a network. The storage device is configured to store a block list. The processor is coupled to the network interface device and the storage device, and configured to selectively allow at least one communication port to serve as a service port for connecting with an external device according to environment information of the network, receive a network packet sent by the external device through the network by using the network interface device, and determine whether a destination port of the network packet is one of the service ports. If the destination port is one of the service ports, the processor establishes a connection with the external device and provides services. If the destination port is not one of the service ports, the processor blocks connection of the external device and adds identification information of the external device to the block list.

In some embodiments, the processor further determines whether the identification information of the external device is in the block list, and blocks the connection of the external device when determining that the identification information is in the block list.

In some embodiments, the processor determines whether the destination port of the network packet is the service port to block the illegal external device before performing connection tracking, denial-of-service attack (DOS attack) defence, or destination network address translation (DNAT).

In some embodiments, the network apparatus is a router or a gateway, and the network includes an Intranet and an internet. The processor further obtains the communication port opened by at least one host in the Intranet to serve as the service port for connecting with the external device.

In some embodiments, the processor receives the network packet sent by the external device through the internet, and determines whether the destination port of the network packet is one of the service ports. If the destination port is one of the service ports, the processor transmits the network packet to the host corresponding to the service port, and if the destination port is not one of the service ports, the processor blocks the network packet from flowing into the Intranet.

In some embodiments, the processor includes selecting an Internet protocol address (IP Address), a media access control address (MAC address), a universally unique identifier (UUID), or a combination thereof of the external device as the identification information according to a communication protocol adopted by the network interface device.

In some embodiments, the processor determines whether the destination port of the network packet complies with a verification rule. If the destination port is one of the service ports and complies with the verification rule, the processor establishes the connection with the external device and provides services, and if the destination port does not comply with the verification rule, the processor blocks the connection of the external device, and adds the identification information of the external device to the block list.

A network attack blocking method in the invention is applicable to a network apparatus including a network interface device and a processor. The method includes following. The network interface device is used to connect to a network, and at least one communication port is selectively allowed to serve as a service port for connecting with an external device according to environment information of the network. A network packet sent by the external device through the network is received by using the network interface device, and it is determined whether a destination port of the network packet is one of the service ports. If the destination port is one of the service ports, a connection with the external device is established, and services are provided. If the destination port is not one of the service ports, connection of the external device is blocked, and identification information of the external device is added to the block list.

In some embodiments, after the network packet sent by the external device through the network is received, the method further includes the following. It is determined whether the identification information of the external device is in the block list, and the connection of the external device is blocked when it is determined that the identification information is in the block list.

In some embodiments, the step of determining whether the destination port of the network packet is the service port to block the illegal external device is performed before performing connection tracking, denial-of-service attack defence, or destination network address translation.

In some embodiments, the network apparatus is a router or a gateway, and the network includes an Intranet and an internet. The method further includes the following. The communication port opened by at least one host in the Intranet is obtained to serve as the service port for connecting with the external device.

In some embodiments, the method further includes the following. The network packet sent by the external device through the internet is received, and it is determined whether the destination port of the network packet is one of the service ports. If the destination port is one of the service ports, the network packet is transmitted to the host corresponding to the service port. If the destination port is not one of the service ports, the network packet is blocked from flowing into the Intranet.

In some embodiments, the identification information is selected from an Internet protocol address, a media access control address, a universally unique identifier, or a combination thereof of the external device according to a communication protocol adopted by the network interface device.

In some embodiments, the method further includes the following. It is determined whether the destination port of the network packet complies with a verification rule. If the destination port is one of the service ports and complies with the verification rule, the connection with the external device is established, and the services are provided. If the destination port does not comply with the verification rule, the connection of the external device is blocked, and the identification information of the external device is added to the block list.

The network apparatus and the network attack blocking method thereof in the invention selectively allow a specific communication port to serve as a service port according to the environment information of the network, and when a network packet is received, whether a source device thereof is legal is determined by identifying the destination port, and the identification information of the illegal source device is recorded in the block list to exclude all source packets that have been in contact with abnormal services, so as to greatly reduce a burden of the network apparatus defending against network attacks.

In order for the aforementioned features and advantages of the invention to be more comprehensible, several embodiments accompanied with drawings are described in detail as follows.

DESCRIPTION OF THE EMBODIMENTS

The embodiment of the invention provides a new network apparatus protection mechanism, which adopts an either-white-or-black strategy, and considers all attempts to access communication ports that are not legally allowed on the device as malicious attacks, so as to identify early reconnaissance and scanning behaviors of an attacker. For network packets sent by any device in a network, as long as a destination port thereof is not a service port legally provided by a local machine, a source location of the device will be directly included in a block list to block the network packets sent by the device.

Figure 1:
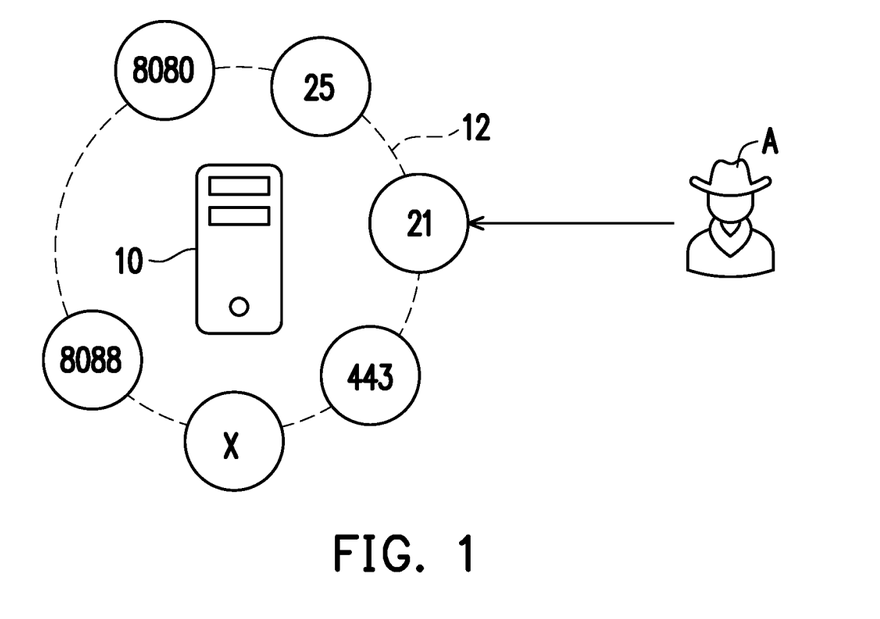
FIG. 1 is a schematic diagram of a network attack blocking method according to an embodiment of the invention.

FIG. 1 is a schematic diagram of a network attack blocking method according to an embodiment of the invention. Referring to FIG. 1, a network apparatus 10 of the embodiment adopts an either-white-or-black strategy, and in a network domain 12 thereof, only a communication port X is allowed to be used as a service port for connecting with an external device, and other communication ports (implemented in port numbers 21, 25, 443, 8080, 8088, etc., in the embodiment) are regarded as abnormal service ports. When any device in the network tries to send packets to the other communication ports, it is considered as a malicious attack. These abnormal service ports do not need to be opened on the device, i.e., no application layer program or service need to listen. There may be multiple communication ports X, i.e., the X may be a set. The port numbers of the other communication ports (the abnormal service ports) are not limited to 21, 25, 443, 8080, and 8088. Any other communication port numbers not belonging to the communication port X are regarded as the abnormal service ports.

When an attacker A attempts to attack the network apparatus 10, for example, the attacker may use a port scanning tool to scan common service ports first, and a scanning order varies according to a tool type. Regarding a common network mapper (NMAP), it may adjust parameters to scan sequentially, or use multi-thread to scan synchronously.

However, when the attacker A uses any tool to try to access any communication port other than the communication port X, the network apparatus 10 may regard it as a malicious attack, and record identification information of the attacker A to the block list.

Since the network apparatus only allows the legal communication port X as a service port, when the attacker tries to connect to other communication ports (abnormal service ports), since the services are not enabled, no response is obtained, and only a time-out result is obtained finally. However, from the perspective of the network apparatus, it may record a source of the connection to perform subsequent blocking actions.

Figure 2:
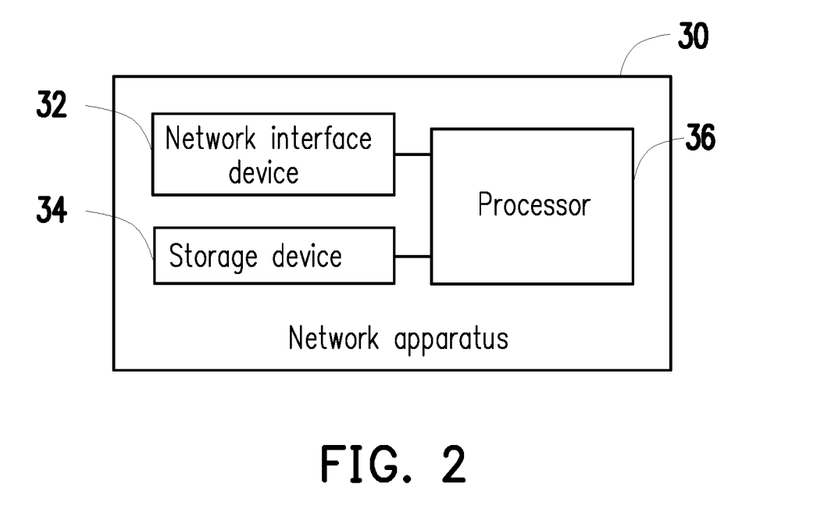
FIG. 2 is a block diagram of a network apparatus according to an embodiment of the invention.

In detail, FIG. 2 is a block diagram of a network apparatus according to an embodiment of the invention. Referring to FIG. 2, a network apparatus 30 of the embodiment includes a network interface device 32, a storage device 34 and a processor 36, where the processor 36 is coupled to the network interface device 32 and the storage device 34.

The network interface device 32 is, for example, a network card that supports wired network connections such as Ethernet, etc., or supports wireless network cards of wireless communication standards such as institute of electrical and electronics engineers (IEEE) 802.11n/b/g/ac/ax/be, etc., which may be connected to a network through a wired or wireless manner (for example, using Wifi6, Wifi7, 5G, satellite communication, optical fiber, virtualized network framework, etc., and the type of the applicable network is not limited by the invention), including internet and Intranet such as the Internet, etc., so that the network apparatus 30 may be connected with an external device through ae network communication protocol.

The storage device 34 is, for example, any type of fixed or removable random access memory (RAM), read-only memory (ROM), flash memory or similar elements or combinations of the above elements. In the embodiment, in addition to storing a program that may be used to realize the network attack blocking method of the embodiment, the storage device 34 may also be used to store a block list, which records identification information of the external devices that have tried to access the illegal service ports.

The processor 36 is, for example, a central processing unit (CPU), or other programmable general purpose or special purpose microprocessor, digital signal processor (DSP), programmable controller, application specific integrated circuits (ASIC), programmable logic device (PLD) or other similar devices or a combination of these devices. In the embodiment, the processor 36 is in charge of an overall operation of the network apparatus 30, and may access and execute the program stored in the storage device 34, so as to realize the network attack blocking method of the embodiment.

Figure 3:
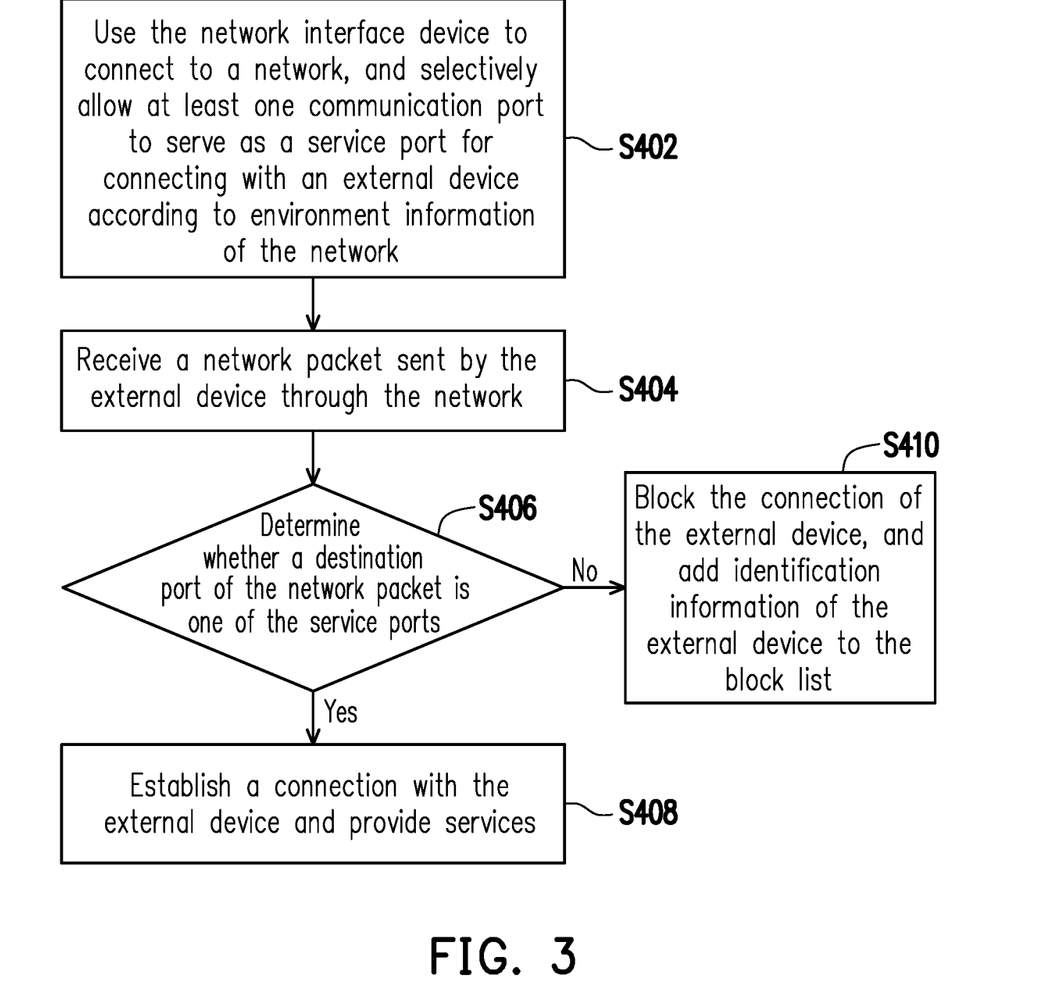
FIG. 3 is a flowchart of a network attack blocking method according to an embodiment of the invention.

FIG. 3 is a flowchart of a network attack blocking method according to an embodiment of the invention. Referring to FIG. 2 and FIG. 3 at the same time, the method of the embodiment is applicable to the aforementioned network apparatus 30. A detailed flow of the method of the embodiment will be described below with reference of various components of the network apparatus 30 in FIG. 2.

First, in step S402, the processor 36 of the network apparatus 30 uses the network interface device 32 to connect to a network, and selects to allow at least one communication port to serve as a service port for connecting with an external device according to environment information of the network. The environment information is, for example, a communication protocol used by the network interface device 32 to connect to the network, a network bandwidth, a type of the provided network service, etc., which is not limited by the invention.

In some embodiments, the network apparatus 30 may be implemented as a relay device such as a router or a gateway for protecting a back-end device. At this time, the environment information obtained by the network apparatus 30 may be information provided by a host in the Intranet, such as information of communication ports opened by each host.

Then, in step S404, the processor 36 uses the network interface device 32 to receive a network packet sent by the external device through the network, and in step S406, the processor 36 determines whether a destination port of the network packet is one of the service ports.

If the destination port is one of the service ports, then in step S408, the processor 36 uses the network interface device 32 to establish a connection with the external device and provide services.

Conversely, if the destination port is not one of the service ports, then in step S410, the processor 36 blocks the connection of the external device, and adds identification information of the external device to the block list stored in the storage device 34.

In some embodiments, the processor 36, for example, selects an Internet protocol address (IP address), a media access control address (MAC address), a universal unique identifier (UUID), or a combination thereof of the external device as the identification information according to the communication protocol adopted by the network interface device 32, and the type of the identification information is not limited by the embodiment.

In some embodiments, the processor 36 determines whether the destination port of the network packet is the service port before performing connection tracking, so as to block the illegal external device. Namely, the processor 36 directly implements a judgment process at a position of a raw table in prerouting on processing of a netfilter, so that resources consumed in performing connection tracking may be saved.

In some embodiments, the processor 36 blocks the illegal source device according to the identified destination port before performing denial-of-service attack (DOS attack) defence, so that all source packets that have been in contact with abnormal services are excluded, so as to greatly reduce a burden of the DOS attack defence.

Thus, in the embodiment, by directly excluding the source device without doing connection tracking, the required resources only need to record whether the source device in the network domain is an illegal connection source, so that used computing and memory resources may be greatly reduced.

Taking a network environment of Internet protocol version 4 (Pv4) class C as an example, its subnet mask is 255.255.255.0, and Internet protocol (IP) only needs 254 record spaces to identify illegal connection sources in the environment.

Figure 4:
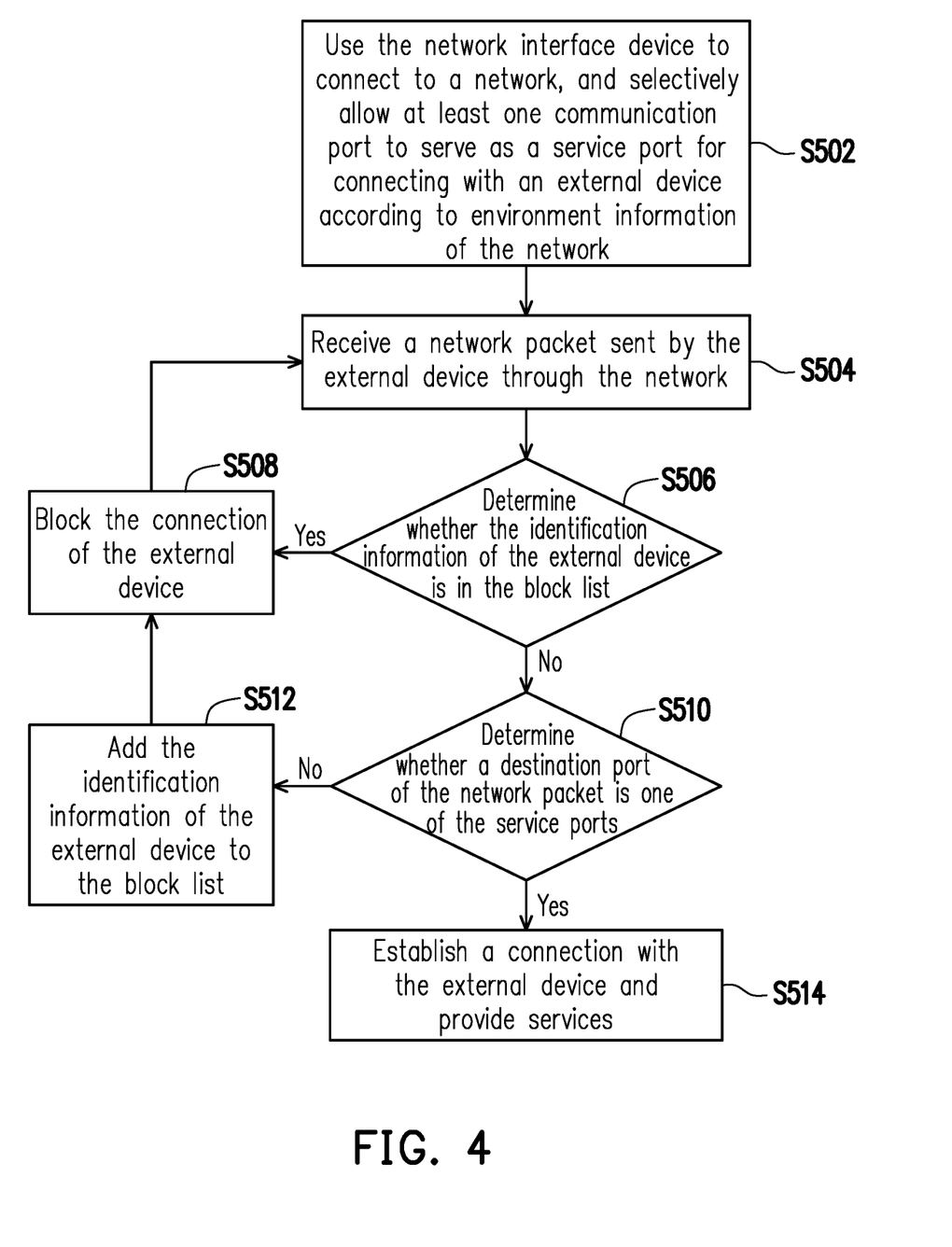
FIG. 4 is a flowchart of a network attack blocking method according to an embodiment of the invention.

FIG. 4 is a flowchart of a network attack blocking method according to an embodiment of the invention. Referring to FIG. 2 and FIG. 4 at the same time, the method of the embodiment is applicable to the aforementioned network apparatus 30. A detailed flow of the method of the embodiment will be described below with reference of various components of the network apparatus 30 in FIG. 2.

First, in step S502, the processor 36 of the network apparatus 30 uses the network interface device 32 to connect to a network, and selects to allow at least one communication port to serve as a service port for connecting with the external device according to environment information of the network.

Then, in step S504, the processor 36 uses the network interface device 32 to receive a network packet sent by the external device through the network. The aforementioned steps S502 and S504 are the same or similar to the steps S402 and S404 of the aforementioned embodiment, so that details thereof will not be repeated here.

Different from the aforementioned embodiment, in the embodiment, in step S506, the processor 36 determines whether the identification information of the external device is in the block list.

If the identification information of the external device is in the block list, then in step S508, the processor 36 blocks the connection of the external device, and returns to step S504, and the processor 36 re-receives the network packet sent by the external device through the network.

Conversely, if the identification information of the external device is not in the block list, then in step S510, the processor 36 determines whether a destination port of the network packet is one of the service ports.

If the destination port is one of the service ports, then in step S514, the processor 36 uses the network interface device 32 to establish a connection with the external device and provide services.

Conversely, if the destination port is not one of the service ports, then in step S512, the processor 36 adds the identification information of the external device to the block list stored in the storage device 34, and in step S508, the processor 36 blocks the connection of the external device. Finally, the flow returns to step S504, and the processor 36 re-receives the network packet sent by the external device through the network.

In some embodiments, the processor 36 may adopt different strategies such as restarting the apparatus, timing clearing, etc., to clear the identification information in the block list, and the clearing method is not limited by the embodiment.

Thus, the embodiment identifies the source of the received network packet by using the block list, identifies the destination port of the network packet, and blocks the illegal source connection according to the identification result, so that the used computing and memory resources may be greatly reduced.

Figure 5:
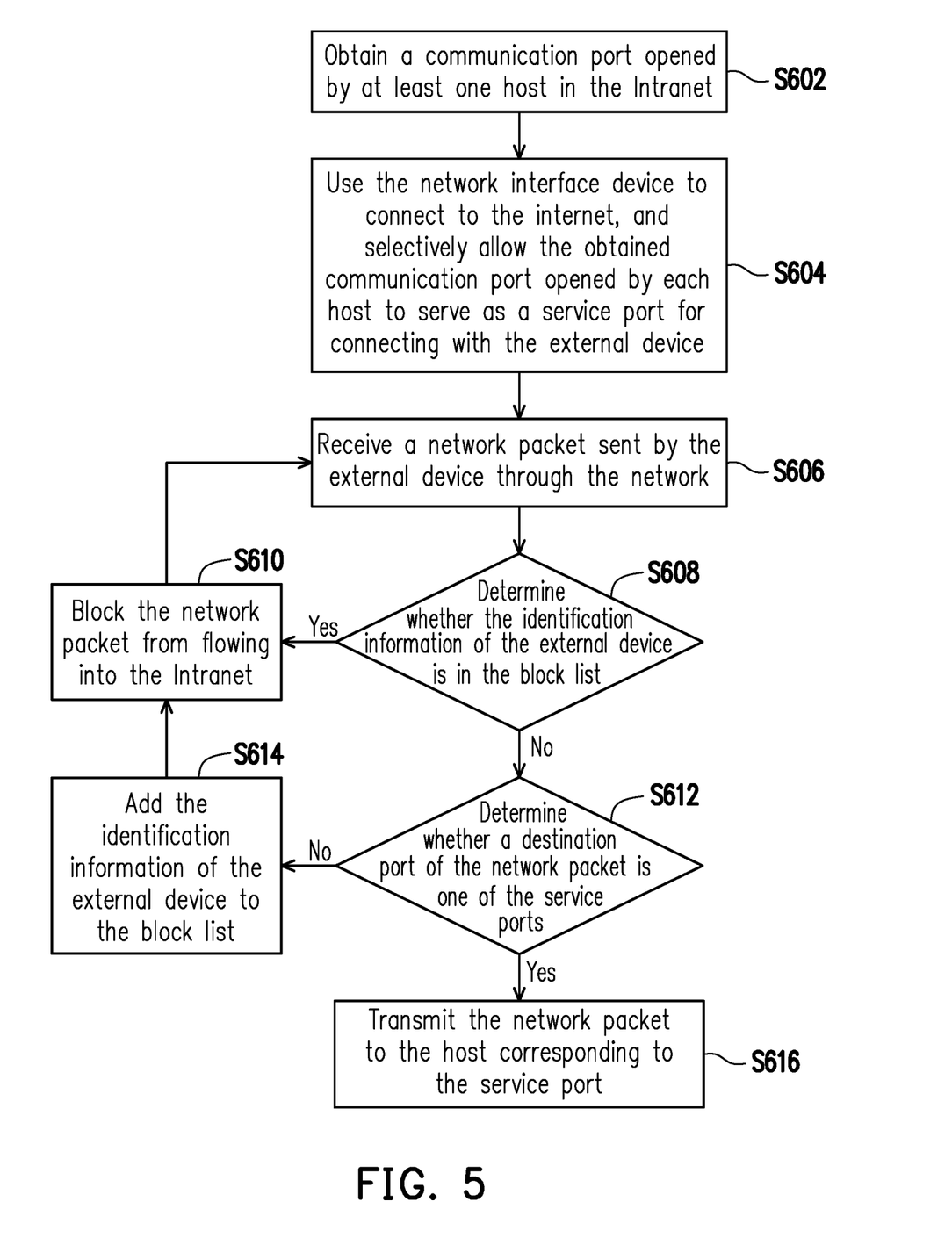
FIG. 5 is a flowchart of a network attack blocking method according to an embodiment of the invention.

FIG. 5 is a flowchart of a network attack blocking method according to an embodiment of the invention. Referring to FIG. 2 and FIG. 5 at the same time, the method of the embodiment is applicable to the aforementioned network apparatus 30. In the embodiment, the network apparatus 30 is implemented in the form of a relay device such as a router or a gateway to protect a back-end device (host) from being attacked by an external device. Namely, the network apparatus 30 is used as a relay device of the back-end device to connect with the external device, and provide the services of the back-end device to the external device, and after receiving the network packet sent from the external device to the back-end device, the network apparatus 30 also acts as a relay device to identify and block suspicious network packets to protect the back-end device from being attacked by the external device. The detailed flow of the method of the embodiment will be described below with reference of various components of the network apparatus 30 in FIG. 2.

First, in step S602, the processor 36 of the network apparatus 30 obtains a communication port opened by at least one host in the Intranet. In some embodiments, the processor 36 may use the network interface device 32 to connect to the Intranet, and connect to the at least one host through the Intranet, so as to obtain the communication port opened by each host. In other embodiments, the processor 36 may also receive a manual operation, or obtain the communication port opened by each host according to factory preset values or other methods, and the obtaining method is not limited by the embodiment.

Then, in step S604, the processor 36 uses the network interface device 32 to connect to the internet, and selects to allow the obtained communication port opened by each host to serve as a service port for connecting with the external device. For example, if there are three hosts in the Intranet, and the opened communication ports are respectively 80, 81, and 82, then after obtaining the opened communication ports of these three hosts, the processor 36 may allow the communication ports 80, 81, and 82 to serve as service ports for connecting with the external device.

Then, in step S606, the processor 36 uses the network interface device 32 to receive a network packet sent by the external device through the network, and in step S608, the processor 36 determines whether identification information of the external device is in the block list.

If the identification information of the external device is in the block list, then in step S610, the processor 36 blocks the network packet from flowing into the Intranet, and returns to step S606, and the processor 36 re-receives the network packet sent by the external device through the network. In some embodiments, while the processor 36 blocks the network packet from flowing into the Intranet, the processor 36 also blocks the attack on the router or the gateway itself, so as to prevent the router or the gateway from external attacks.

Conversely, if the identification information of the external device is not in the block list, then in step S612, the processor 36 determines whether the destination port of the network packet is one of the service ports.

If the destination port is one of the service ports, then in step S616, the processor 36 uses the network interface device 32 to transmit the network packet to the host corresponding to the service port, so that the external device may establish a connection with the network apparatus and get services.

Conversely, if the destination port is not one of the service ports, then in step S614, the processor 36 adds the identification information of the external device to the block list stored in the storage device 34, and in step S610, the processor 36 blocks the network packet from flowing into the Intranet, and finally the flow returns to step S606, and the processor 36 re-receives the network packet sent by the external device through the network.

Thus, in the embodiment, by using the relay device to restrict the ports that the back-end device provides services in a specific field, the source device that inquires about other arbitrary ports is blocked, which may protect the relay device and the back-end device from to be attacked by the external device.

It should be noted that, in an embodiment of the invention, the processor 36 further determines whether the destination port of the network packet complies with a verification rule. For example, the verification rule may be a connection sequence of the legal communication ports X, for example, the port numbers of the legal communication ports are 21, 25, 443, 8080, 8088, and the connection sequence is 21, 8088, 25, 8080, 443. If the port number connected to by the external device for the first time is 8088, although the processor 36 may determine that the external device is connected to the legal communication port, since it is not complied with the verification rule, the processor 36 may still block the connection of the external device. The verification rule may be designed according to different algorithms or various network applications, which is not limited by the invention.

In addition, for different external devices, the network apparatus 30 may also design different legal communication ports and verification rules. For example, the legal connection ports corresponding to a first external device are a set X and a first verification rule, and the legal connection ports corresponding to a second external device are a set Y and a second verification rule. Alternatively, different external devices may correspond to the same legal communication port and different verification rules; or different external devices may correspond to different legal communication ports and the same verification rule. In the case of multiple external devices, related description may be deduced in the same way, and detail thereof will not be repeated here.

In some embodiments, when the above method is implemented on a router or a network address translation (NAT) device, the process of blocking the illegal external device may be performed after performing a DoS attack defence or destination network address translation (DNAT) according to an actual need, so as to achieve the purpose of protecting other devices.

In summary, the network apparatus and its network attack blocking method of the invention adopt an either-white-or-black strategy to achieve the purpose of device protection through the known information that the local machine provides services without the need of performing quantity statistics or setting thresholds, which may be implemented more easily to mitigate network flooding attack and DOS Attack. This method may use extremely low resources to achieve a protection effect on devices with limited computing resources (such as industrial devices using a Modbus protocol).

It will be apparent to those skilled in the art that various modifications and variations can be made to the disclosed embodiments without departing from the scope or spirit of the invention. In view of the foregoing, it is intended that the invention covers modifications and variations provided they fall within the scope of the following claims and their equivalents.

What is claimed is:

1. A network apparatus, comprising:
   a network interface device connected to a network;
   a storage device storing a block list;
   a processor coupled to the network interface device and the storage device and configured to:
   selectively allow a plurality of communication ports to serve as service ports for connecting with an external device according to environment information of the network;
   receive a network packet sent by the external device through the network by using the network interface device, and determine whether a destination port of the network packet is one of the service ports and complies with a connection sequence of the plurality of communication ports;
   if the destination port is one of the service ports and complies with the connection sequence, establish a connection with the external device and provides services; and
   if the destination port is not one of the service ports or does not comply with the connection sequence, block connection of the external device and add identification information of the external device to the block list.

2. The network apparatus according to claim 1, wherein the processor further determines whether the identification information of the external device is in the block list, and blocks the connection of the external device when determining that the identification information is in the block list.

3. The network apparatus according to claim 1, wherein the processor determines whether the destination port of the network packet is one of the service ports to identify the external device as an illegal external device and block the illegal external device before performing connection tracking, denial-of-service attack (DOS attack) defence, or destination network address translation (DNAT).

4. The network apparatus according to claim 1, wherein the network apparatus is a router or a gateway, and the network comprises an Intranet and an internet, wherein
   the processor further obtains the plurality of communication ports opened by at least one host in the Intranet to serve as the service ports for connecting with the external device.

5. The network apparatus according to claim 4, wherein the processor receives the network packet sent by the external device through the internet, and determines whether the destination port of the network packet is one of the service ports and complies with a connection sequence of the plurality of communication ports;
   if the destination port is one of the service ports and complies with the connection sequence, the processor transmits the network packet to the host corresponding to the service port; and
   if the destination port is not one of the service ports or does not comply with the connection sequence, the processor blocks the network packet from flowing into the Intranet.

6. The network apparatus according to claim 1, wherein the processor selects an Internet protocol address (IP Address), a media access control address (MAC address), a universally unique identifier (UUID), or a combination thereof of the external device as the identification information according to a communication protocol adopted by the network interface device.

7. A network attack blocking method, applicable to a network apparatus comprising a network interface device and a processor, and comprising:
   using the network interface device to connect to a network, and selectively allowing a plurality of communication ports to serve as service ports for connecting with an external device according to environment information of the network;
   receiving a network packet sent by the external device through the network by using the network interface device, and determining whether a destination port of the network packet is one of the service ports and complies with a connection sequence of the plurality of communication ports;
   if the destination port is one of the service ports and complies with the connection sequence, establishing a connection with the external device and providing services; and
   if the destination port is not one of the service ports or does not comply with the connection sequence, blocking connection of the external device and adding identification information of the external device to the block list.

8. The network attack blocking method according to claim 7, wherein after the step of receiving the network packet sent by the external device through the network, the method further comprises:
   determining whether the identification information of the external device is in the block list; and
   blocking the connection of the external device when determining that the identification information is in the block list.

9. The network attack blocking method according to claim 7, wherein the step of determining whether the destination port of the network packet is one of the service ports to identify the external device as an illegal external device and block the illegal external device is performed before performing connection tracking, denial-of-service attack defence, or destination network address translation.

10. The network attack blocking method according to claim 7, wherein the network apparatus is a router or a gateway, the network comprises an Intranet and an internet, and the method further comprises:
    obtaining the plurality of communication ports opened by at least one host in the Intranet to serve as the service ports for connecting with the external device.

11. The network attack blocking method according to claim 10, further comprising:
    receiving the network packet sent by the external device through the internet, and determining whether the destination port of the network packet is one of the service ports and complies with a connection sequence of the plurality of communication ports;
    if the destination port is one of the service ports and complies with the connection sequence, transmitting the network packet to the host corresponding to the service port; and
    if the destination port is not one of the service ports or does not comply with the connection sequence, blocking the network packet from flowing into the Intranet.

12. The network attack blocking method according to claim 7, wherein the identification information is selected from an Internet protocol address, a media access control address, a universally unique identifier (UUID), or a combination thereof of the external device according to a communication protocol adopted by the network interface device.

\* \* \* \* \*